US011755926B2

(12) United States Patent
Gupta et al.

(10) Patent No.: US 11,755,926 B2
(45) Date of Patent: Sep. 12, 2023

(54) PRIORITIZATION AND PREDICTION OF JOBS USING COGNITIVE RULES ENGINE

(71) Applicant: INTERNATIONAL BUSINESS MACHINES CORPORATION, Armonk, NY (US)

(72) Inventors: Ritesh Kumar Gupta, Hyderabad (IN); Namit Kabra, Hyderabad (IN); Likhitha Maddirala, Hyderabad (IN); Eric Allen Jacobson, Arlington, MA (US); Scott Louis Brokaw, Groton, MA (US); Jo Ramos, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 16/288,739

(22) Filed: Feb. 28, 2019

(65) Prior Publication Data

US 2020/0279173 A1    Sep. 3, 2020

(51) Int. Cl.
| | | |
|---|---|---|
| *G06F 9/48* | (2006.01) | |
| *G06F 9/50* | (2006.01) | |
| *G06N 3/08* | (2023.01) | |
| *G06N 5/025* | (2023.01) | |
| *H04L 41/5022* | (2022.01) | |
| *H04L 41/5019* | (2022.01) | |

(52) U.S. Cl.
CPC .......... *G06N 5/025* (2013.01); *G06F 9/4881* (2013.01); *G06F 9/5038* (2013.01); *G06N 3/08* (2013.01); *H04L 41/5022* (2013.01); *G06F 2209/484* (2013.01); *G06F 2209/5019* (2013.01); *H04L 41/5019* (2013.01)

(58) Field of Classification Search
None
See application file for complete search history.

(56) References Cited

U.S. PATENT DOCUMENTS

| | | | |
|---|---|---|---|
| 5,473,773 A | 12/1995 | Aman | |
| 8,639,553 B1 * | 1/2014 | Knauth | ............ G06Q 10/06312 705/7.22 |
| 9,338,065 B2 * | 5/2016 | Vasseur | ............... H04L 41/5009 |

(Continued)

FOREIGN PATENT DOCUMENTS

WO    2016018400 A1    2/2016

OTHER PUBLICATIONS

Author Unknown, "Informatica PowerCenter Load Balancing for Workload Distribution of Grid", 9 pages, 2012-2017 Data Integration Solution, [online], [retrieved on Jan. 21, 2019]. Retrieved from the internet <URL: http://www.disoln.org/2013/11/Informatica-PowerCenter-Load-Balancing-for-Workload-Distribution.html>.

(Continued)

*Primary Examiner* — Abu Zar Ghaffari
(74) *Attorney, Agent, or Firm* — Teddi E. Maranzano

(57) ABSTRACT

A method, computer system, and a computer program product for data pipeline prioritization is provided. Embodiments may include receiving, by a cognitive rules engine, one or more data pipelines. Embodiments may then include analyzing, using a computational method of the cognitive rules engine, the one or more data pipelines. Embodiments may lastly include prioritizing the one or more data pipelines based on a result of the computational method of the cognitive rules engine.

17 Claims, 6 Drawing Sheets

(56) References Cited

U.S. PATENT DOCUMENTS

| | | | | |
|---|---|---|---|---|
| 10,349,208 B1* | 7/2019 | Liang | | G06F 16/29 |
| 10,366,343 B1* | 7/2019 | Zappella | | H04L 67/10 |
| 2012/0198463 A1* | 8/2012 | Cheng | | H04Q 11/0478 |
| | | | | 718/103 |
| 2014/0075005 A1* | 3/2014 | Tung | | G06F 11/3006 |
| | | | | 709/223 |
| 2014/0195466 A1* | 7/2014 | Phillipps | | G06F 16/00 |
| | | | | 706/12 |
| 2015/0356442 A1* | 12/2015 | Chawla | | G06Q 30/0277 |
| | | | | 706/55 |
| 2016/0085637 A1 | 3/2016 | Vlachogiannis | | |
| 2016/0086116 A1* | 3/2016 | Rao | | G06F 3/0481 |
| | | | | 705/7.21 |
| 2016/0162478 A1* | 6/2016 | Blassin | | G06Q 10/063112 |
| | | | | 706/12 |
| 2016/0179063 A1 | 6/2016 | De Baynast De Septfontaines | | |
| 2016/0226955 A1* | 8/2016 | Moorthi | | G06Q 10/06 |
| 2016/0359683 A1* | 12/2016 | Bartfai-Walcott | | |
| | | | | H04L 41/5009 |
| 2017/0249574 A1* | 8/2017 | Knijnik | | G06Q 10/06313 |
| 2017/0330264 A1* | 11/2017 | Youssef | | G06F 16/24578 |
| 2018/0082190 A1* | 3/2018 | Cormier | | G06N 7/046 |
| 2018/0129955 A1* | 5/2018 | Saxena | | G06N 5/043 |
| 2018/0232659 A1* | 8/2018 | Ranatunga | | G06N 7/01 |
| 2018/0364871 A1* | 12/2018 | Bostick | | G06N 5/025 |
| 2019/0034792 A1* | 1/2019 | Kataria | | G06N 3/042 |
| 2019/0130304 A1* | 5/2019 | Gupta | | G06F 16/334 |
| 2019/0130327 A1* | 5/2019 | Carpenter | | G06F 9/45558 |
| 2019/0138830 A1* | 5/2019 | Justice | | G06V 20/46 |
| 2019/0187685 A1* | 6/2019 | Cella | | G06Q 10/04 |
| 2019/0213509 A1* | 7/2019 | Burleson | | G06N 20/00 |
| 2020/0092319 A1* | 3/2020 | Spisak | | G06N 7/00 |
| 2021/0216560 A1* | 7/2021 | Power | | G06F 16/9032 |

OTHER PUBLICATIONS

Mell et al., "The NIST Definition of Cloud Computing", National Institute of Standards and Technology, Special Publication 800-145, Sep. 2011, pp. 1-7.

Somu, et al, "Consolidating batch and transactional workloads using dependency structure prioritization", International Journal of Engineering and Technology (IJET), Apr.-May 2013, vol. 5, No. 2, 8 pages, ISSN: 0975-4024.

Thiele, "Partition-Based Workload Scheduling in Living Data Warehouse Environments", Technische Universität Dresden, DOLAP, Nov. 9, 2007, 19 pages, Department of Computer Science, Institute for System Architecture, Database Technology Group, Lisbon, PT.

* cited by examiner

PRIORITIZATION AND PREDICTION OF JOBS USING COGNITIVE RULES ENGINE

BACKGROUND

The present invention relates generally to the field of computing, and more particularly to information management.

A pipeline (i.e., a data pipeline, a job) may be used for feeding a data repository (e.g., a data lake) where data may be moved, transformed and loaded for data analytics, ad hoc investigations, and/or reporting, among other things. When triggered, a data pipeline may be run on a first come, first served basis.

SUMMARY

Embodiments of the present invention disclose a method, computer system, and a computer program product for data pipeline prioritization. Embodiments of the present invention may include receiving, by a cognitive rules engine, one or more data pipelines. Embodiments of the present invention may then include analyzing, using a computational method of the cognitive rules engine, the one or more data pipelines. Embodiments of the present invention may lastly include prioritizing the one or more data pipelines based on a result of the computational method of the cognitive rules engine.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
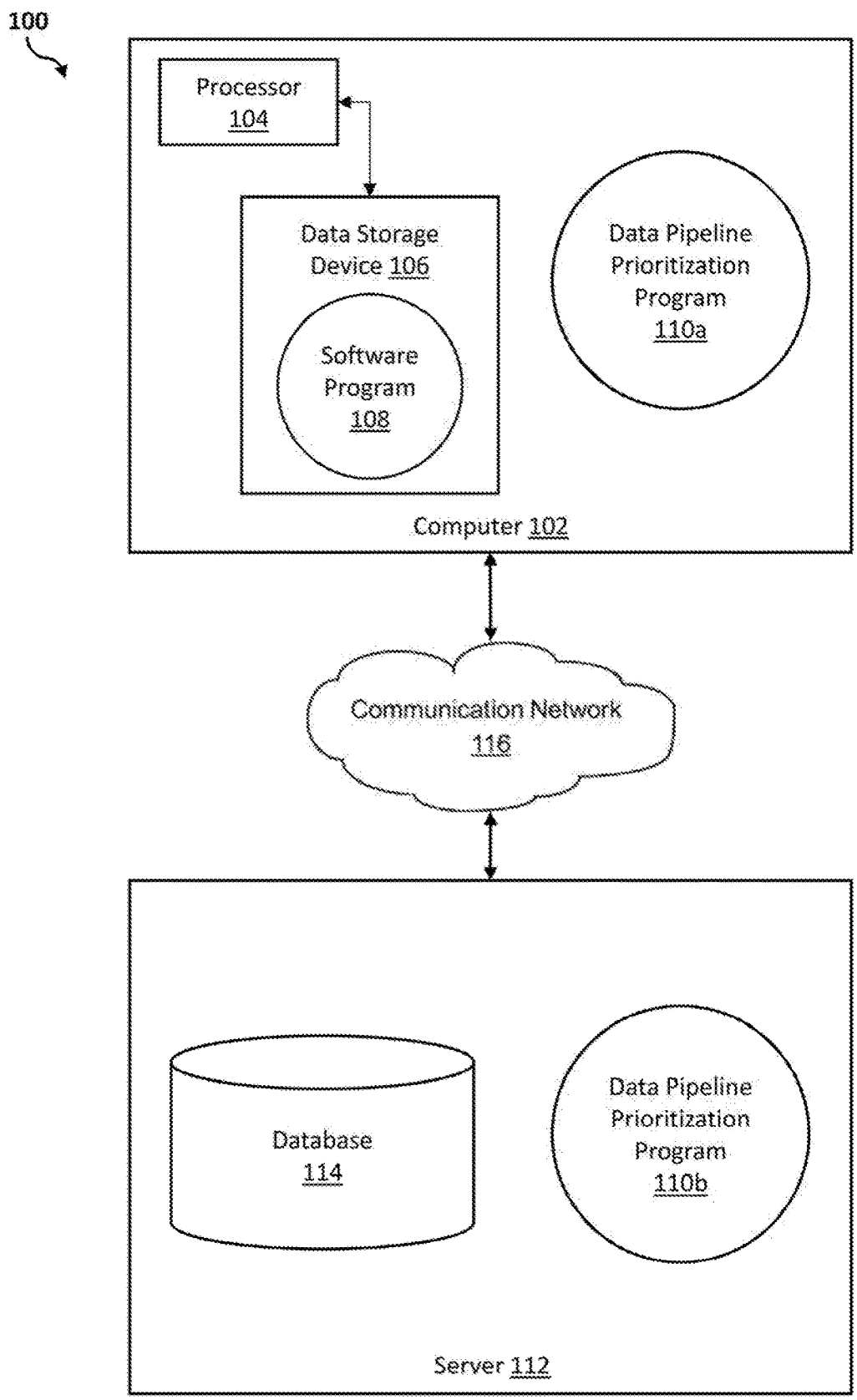
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for data pipeline prioritization. As such, the present embodiment has the capacity to improve the technical field of information management by utilizing a machine learning algorithm to prioritize data pipelines being run on a data lake. The present embodiment may automatically assign priorities to incoming data pipelines based on who is expected to consume the results of the pipeline, who triggered the pipeline, the overall resources needed to run the job, and/or when the job needs to be triggered based on a service level agreement (SLA) for the job. This information may be received through a data governance catalog, such as IBM's InfoSphere® Information Governance Catalog (InfoSphere and all InfoSphere-based trademarks are trademarks or registered trademarks of International Business Machines Corporation in the United States, and/or other countries), among other catalogs which enable users to understand and analyze information.

The machine learning algorithm may be trained on previous job runs, an analysis of dependencies on other pipelines, resource consumption data, and historical priorities.

More specifically, the present invention may include receiving, by a cognitive rules engine, one or more data pipelines. The present invention may then include analyzing, using a computational method of the cognitive rules engine, the one or more data pipelines. The present invention may lastly include prioritizing the one or more data pipelines based on a result of the computational method of the cognitive rules engine.

As described previously, a pipeline (i.e., a data pipeline, a job) may be used for feeding a data repository (e.g., a data lake) where data may be moved, transformed and loaded for data analytics, ad hoc investigations, and/or reporting, among other things. When triggered, a data pipeline may be run on a first come, first served basis.

The scheduling of a data pipeline may not consider that one data pipeline may be more critical than another; that the criticality of a data pipeline may change over a period of time; that a non-resource consuming data pipeline may be scheduled quickly; that there may be one or more service level agreements (SLAs) directing the execution of a data pipeline; or that a data pipeline may be feeding data to a critical pipeline, thereby making the data pipeline critical. Additionally, if the priority of a data pipeline is dynamic, then predicting when a given data pipeline is scheduled and finished may not be possible.

Therefore, it may be advantageous to, among other things, prioritize data pipelines by using a machine learning algorithm to automatically assign an appropriate priority level based on a set of metrics.

According to at least one embodiment, the present invention may utilize a data pipeline prioritization scheme, since resources used for analytics may be limited, and the analysis and reporting may require a time bound result.

According to at least one embodiment of the present invention, a machine learning algorithm may be utilized to reconcile the factors which may influence a data pipeline prioritization scheme. A machine learning algorithm may also be effective at handling large-scale data, including but not limited to sorting and evaluating data (e.g., recognizing the importance of a given job).

According to at least one embodiment of the present invention, information governance and machine learning may be utilized to make a scheduling decision. For example, a data governance catalog, such as IBM's InfoSphere® Information Governance Catalog (InfoSphere and all InfoSphere-based trademarks are trademarks or registered trademarks of International Business Machines Corporation in the United States, and/or other countries), among other catalogs, may be used to assign priorities to incoming data pipelines based on who is expected to consume the results of the data pipeline, who triggered the data pipeline, the overall resources needed to run the data pipeline (i.e., the job), and/or when the data pipeline (i.e., the job) needs to be triggered based on a service level agreement (SLA) for the data pipeline, among other things.

According to at least one embodiment of the present invention, automatic intelligence may be utilized to improve or enhance the schedule of work flows (i.e., data pipelines) as compared with known schedules of work flows.

According to at least one embodiment of the present invention, a machine learning algorithm may learn to prioritize certain data pipelines over others (e.g., to optimize a workload), based on learned metrics, including but not limited to metadata and consuming pipelines.

According to at least one embodiment of the present invention, a data pipeline (i.e., a job) may be transformed and moved to a data lake for analytics. The machine learning algorithm may then determine a priority of scheduling the data pipeline, and based on the determined priority, the jobs may be executed.

According to at least one embodiment of the present invention, information governance may be utilized to assign weights to a data pipeline. This may include giving consideration to which user may have triggered the data pipeline and/or which user may be awaiting a result of the data pipeline.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data pipeline prioritization program 110a. The networked computer environment 100 may also include a server 112 that is enabled to run a data pipeline prioritization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data pipeline prioritization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data pipeline prioritization program 110a, 110b (respectively) to utilize a machine learning algorithm to prioritize data pipelines being run on a data lake. The present embodiment may automatically assign priorities to incoming data pipelines based on who is expected to consume the results of the data pipeline, the overall resources needed to run the job, and/or when the job needs to be triggered based on a service level agreement (SLA) for the job. The machine learning algorithm may be trained on previous job runs, an analysis of dependencies on other pipelines, resource consumption data, and historical priorities. The data pipeline prioritization method is explained in more detail below with respect to FIGS. 2 and 3.

Figure 2:
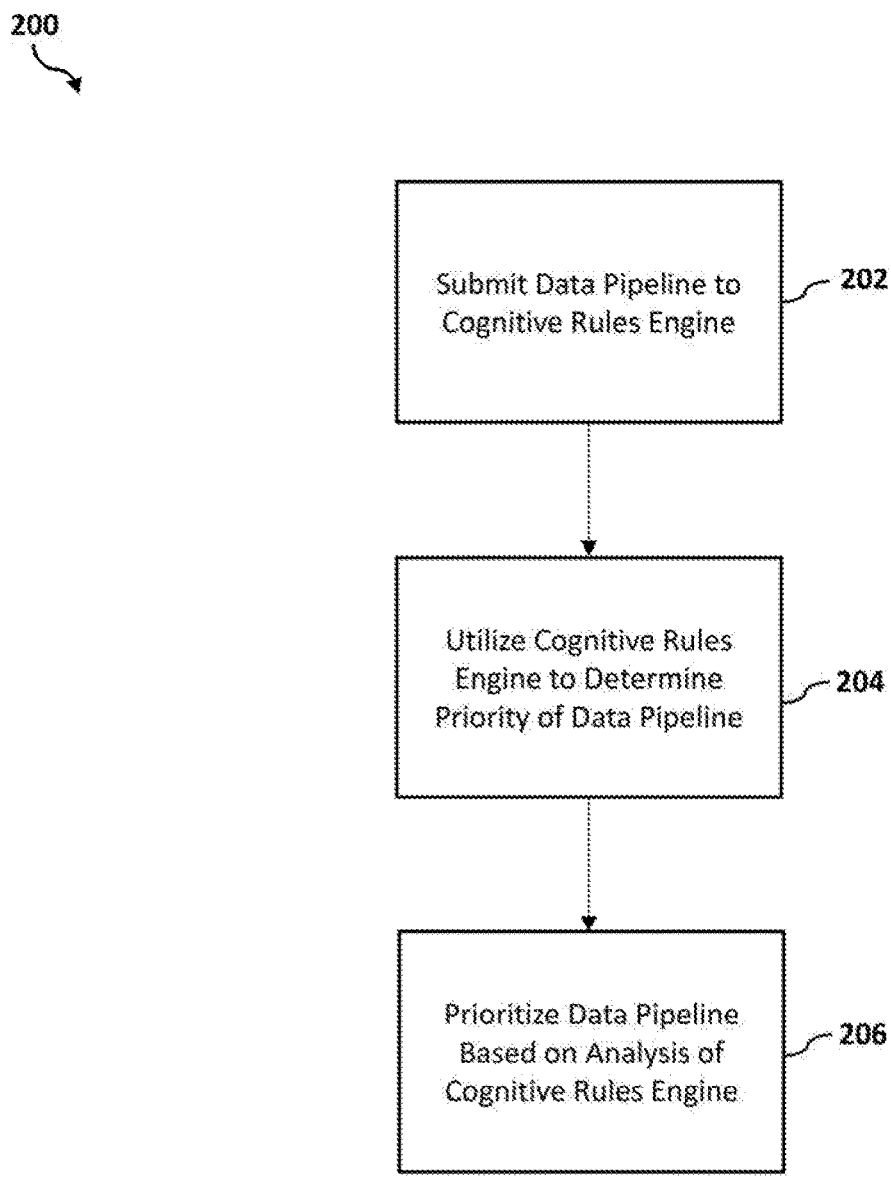
FIG. 2 is an operational flowchart illustrating a process for data pipeline prioritization according to at least one embodiment.

Referring now to FIG. 2, an operational flowchart illustrating the exemplary data pipeline prioritization process 200 used by the data pipeline prioritization program 110a and 110b according to at least one embodiment is depicted.

At 202, the data pipeline is submitted to a cognitive rules engine. A data pipeline (i.e., a job) may be transformed and moved to a data lake (e.g., a data repository) for analytics. A data pipeline may load from and/or feed into a data lake. A priority of scheduling for the data pipeline may be determined while data is loaded in the data lake, and the data pipeline may be executed based on the determined priority.

A data pipeline may be a set of data processing elements which may be connected in a series, wherein the output of one data element is the input to the next data element. The elements of a data pipeline may be executed in parallel or in a time-sliced manner. A data pipeline may be a continuous movement of instruction to the processor or in the steps taken by the processor to perform a given action.

For example, one or more data pipelines may be used to transfer data from a daily transactional database (e.g., a bank's database), wherein analytics may not be run, to a cloud server or data warehouse where the data may be stored for analytics and archival purposes. The one or more data pipelines may be used for the transfer of data from the daily transactional database to the data warehouse or cloud server, and while in the data warehouse or cloud server, an analysis of the data may be performed.

A machine learning algorithm (e.g., a neural network, among other machine learning algorithms) may be used by the cognitive rules engine to determine the priority of a data pipeline (i.e., a job), among various competing data pipelines, without using explicit instructions, and instead relying on models and inference to make a determination. A machine learning algorithm may utilize computational methods to perform data analytics and to learn information from a set of data. The learned information may be used to create a model which may then be used to analyze future sets of data. The model (i.e., the analytical model) created based on the learned information may describe relationships among variables in the data. The model may estimate and/or classify new data based on the new data's proximity (e.g., relatedness) to the created model. The quality of the machine learning model may be improved with an increase in available data.

The data pipeline prioritization program 110a, 110b may utilize a machine learning algorithm to derive the priority of a data pipeline (i.e., a job), among various competing data pipelines.

The machine learning algorithm used by the data pipeline prioritization program 110a, 110b may be a component of the cognitive rules engine, described in more detail with respect to step 204 below.

At 204, the cognitive rules engine determines a priority of a data pipeline (i.e., a job) based on a series of learned metrics. The learned metrics (i.e., computational methods) may comprise a machine learning algorithm of the cognitive rules engine. The learned metrics may take into account factors such as the existence of a service level agreement (SLA), specific user information, and server load, among other factors. The machine learning algorithm may learn from the factors and information, including those described above, and may use the learned factors and information to create a machine learning model. The machine learning model may be fine-tuned (e.g., a model created by the machine learning algorithm may be improved upon) based on information such as a missed SLA, or an overloaded server, among other information. The data pipeline prioritization program 110a, 110b may thereafter use the machine learning model to determine a priority of a data pipeline (i.e., a job).

The learned metrics may include factors which influence the performance of an executing server and/or whether a result of a data pipeline (i.e., a job) will be consumed by another user, among other factors which influence the determination of priority of a data pipeline (i.e., a job). To learn the metrics which influence the determination of the priority of a data pipeline (i.e., a job), the cognitive rules engine of the data pipeline prioritization program 110a, 110b may, for example, perform a result consumption analysis to predict who may consume the result, and a resource consumption analysis to predict the resources which may be required to run the data pipeline (i.e., a job).

The cognitive rules engine may also predict the amount of time that it will take for the data pipeline (i.e., a job) to be run, and when the data pipeline (i.e., a job) may need to be started and ended in order to meet a service level agreement (SLA). This prediction may include an analysis of all data pipelines (i.e., a job) and may give consideration to any data pipelines (i.e., a job) of higher priority which may need to be added in (e.g., executed out of order by an executing server).

The cognitive rules engine may also predict when the executing servers may be available to run a given data pipeline (i.e., a job), based on the current data pipeline (i.e., a job) execution order.

A prioritization prediction may also be based on a failure of the data pipeline data pipeline (i.e., a job), including an SLA being missed and/or a server being overloaded, among other things. In the event of noted failures, the data pipeline prioritization program 110a, 110b may opt to assign a more or less aggressive priority, based on a preconfigured preference of a user. The user may also be given the opportunity to manually enter a priority of a data pipeline (i.e., a job), in the event of a noted failure and/or based on various options of the data pipeline prioritization program 110a, 110b, including who triggered a given data pipeline (i.e., a job), and what reports the data pipeline (i.e., a job) feeds into, among other options. An enterprise user may, by virtue of the user's experience, know which data pipeline (i.e., job) should be given priority.

For example, the machine learning algorithm may be trained by providing to the user a list of who triggered particular data pipelines (i.e., jobs) and/or a list of reports that the data pipeline (i.e., the job) feeds into, based on a preference of the user. A random weight may be assigned for each criterion upon which a prioritization determination may be made. The machine learning algorithm may then correct the weights based on the learned metrics. Alternatively, a machine learning algorithm may learn from a manual priority assignment and begin assigning weights accordingly.

The cognitive rules engine may compute the priority of a data pipeline (i.e., a job) by aggregating the above factors, among other factors affecting the priority of a data pipeline (i.e., a job), to determine a data pipeline's (i.e., a job's) final priority score. Prior to determining a final priority score, each of the factors may be multiplied by a weight corresponding to the importance of the factor. The weight of a single factor may not be the same as the weight of a second factor. The weight of a single factor may also not be determinative of a final priority score. A factor's weight may be influenced by the priority given to the factor by a user of the data pipeline prioritization program 110a, 110b (e.g., by a manual weight assignment). A factor's weight may also be based on initial predefined knowledge (e.g., manual weight assignments) which are used to teach the machine learning algorithm. A factor's weight may ultimately be assigned automatically by the machine learning algorithm based on prior weights.

Further, the weight of a data pipeline (i.e., a job) may not be static. For example, when an SLA provides that a data pipeline (i.e., a job) should be finished within a one-week time frame, the data pipeline (i.e., the job) may be given a low priority. Thereafter, while the data pipeline (i.e., the job) is in the list of data pipelines approaching execution, the priority may begin to improve to meet a service level agreement, and the data pipeline (i.e., the job) may dynamically be given a higher priority.

As described above, a predictive (i.e., trained) model generated by the machine learning algorithm of the cognitive rules engine may predict a result consumption, criticality of a job (i.e., data pipeline), job dependency, job trigger(s), job SLA, and/or resource(s) required by a job, among other things. For each new job, the predictive model may use the generated predictions to rank the job and determine when the ranked job should be executed.

The resulting job (i.e., data pipeline) rank and priority, determined by the machine learning algorithm, may be utilized by the cognitive rules engine in determining an order of priority for the jobs ready for execution.

The predictive model may be retrained at a predetermined interval (e.g., at a daily, weekly, or monthly interval, among other intervals) or upon the completion of a data pipeline (i.e., a job). The predictive model may also be retrained based on user or system feedback (e.g., a service level agreement was missed and may thereafter be given a higher priority).

If the data pipeline is empty or requires minimal resources based on a previous run heuristic, information which may be determined (e.g., learned) by the data pipeline prioritization program 110a, 110b by utilizing results of the machine learning algorithm described in detail with respect to step 202 above, then the data pipeline may be executed without a reprioritization of the data pipelines (i.e., the jobs) (e.g., without any determination of priority by the data pipeline prioritization program 110a, 110b, based on the series of learned metrics previously described).

At 206, the data pipeline is reprioritized based on the determined priority at 204. A prioritization of jobs (i.e., data pipelines) determined by the data pipeline prioritization program 110a, 110b, based on the data analytics performed while the data pipeline was located within the data lake (i.e., the data repository), the machine learning algorithm may determine a priority of scheduling for the data pipeline (i.e., the job). Based on the determined priority, the data pipeline may be executed.

As described previously with respect to step 204 above, the data pipeline prioritization program 110a, 110b may dynamically reprioritize the data pipeline (i.e., the job) based on the dynamic weight assignments of factors affecting the priority of a data pipeline (i.e., a job).

Further, as described previously with respect to step 202 above, the data pipeline may be executed based on the determined priority. In an embodiment, two or more data pipelines may be run in parallel, and data may be partitioned within each of the parallel workflows. If the determined priority of a single data pipeline is less than a second data pipeline, then the amount of parallelism may be reduced (e.g., to one), and the throughput may be better than running multiple data pipelines. In this instance, there may be no need to repartition a set of data.

Conversely, if the determined priority of a single data pipeline is greater than a second data pipeline, then the flow of the data pipelines may be slowed down for the data pipeline with a lower priority, and the parallelism of the data pipeline with the greater priority may increase.

Figure 3:
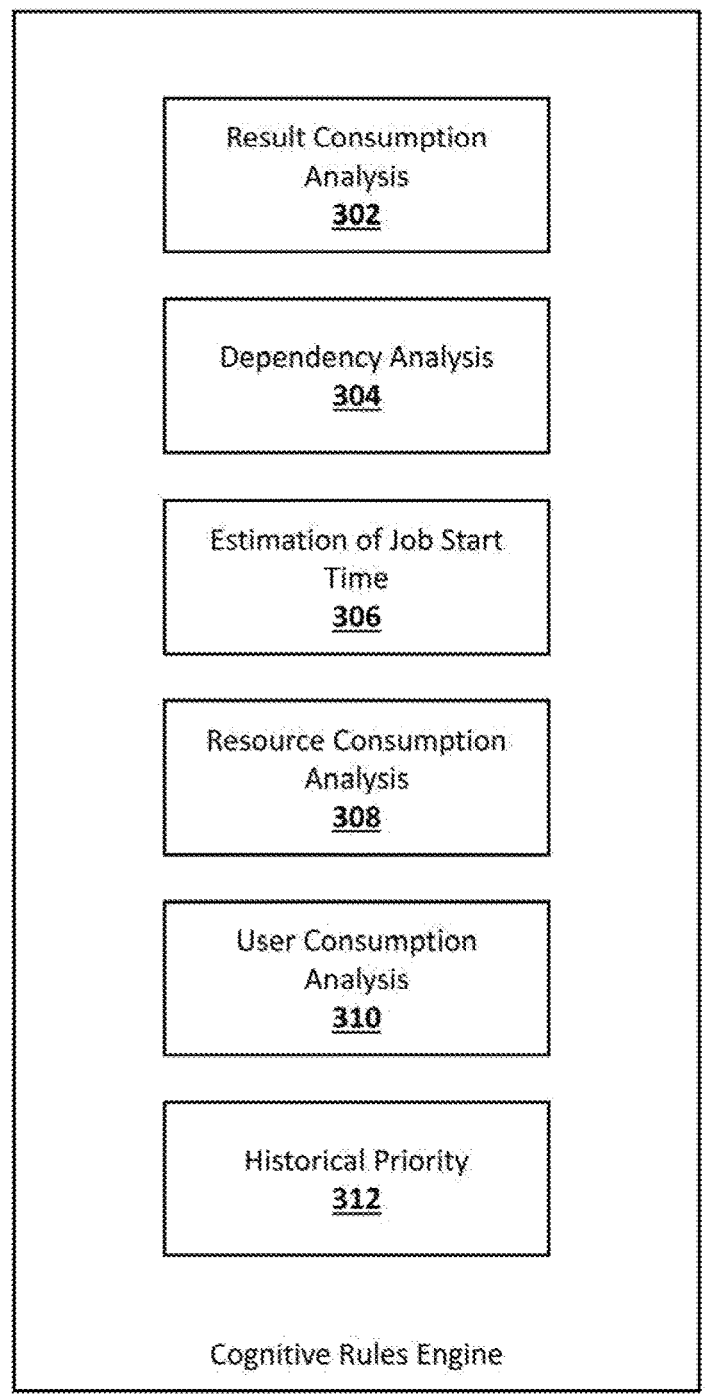
FIG. 3 is a block diagram of the cognitive rules engine according to at least one embodiment.

Referring now to FIG. 3, a block diagram of the cognitive rules engine according to at least one embodiment is depicted.

A result consumption analysis module 302 may refer to the number of consumers of a given result. The priority of a job (i.e., a data pipeline) may be increased as the number of consumers for a job result increases. For example, if the results of a previous pipeline are never consumed, then the data pipeline may be given a low priority. Conversely, if the number of consumers of a job is very high, then the priority of the job may be increased. The priority of a job may be proportionately increased as the number of consumers for the job increases.

The priority of a job (i.e., a data pipeline) may also increase if the consumers of the job are more important than others. For example, if the consumer of a job is a corporation's director who may be preparing for a board meeting, the priority of the job may increase. Similarly, if the consumer of the job is a free user of a computer program who may be running tests, the job may be given a low priority.

A dependency analysis module 304 may refer to whether the result of a current job (i.e., a data pipeline) is used by another job. If the result of a current job is used by another (e.g., a second) job, then the priority of the job may increase. The priority of a current job may be dictated by the priority of the jobs which depend on it. For example, if pipeline "A" modifies the input to pipeline "B," then the priority of pipeline "A" may increase if the priority of pipeline "B" is greater than the priority of pipeline "A." The dependency of jobs may be determined based on metadata, which may be a set of data that describes the jobs. Metadata may be gathered from IBM's InfoSphere® Information Governance Catalog (InfoSphere and all InfoSphere-based trademarks are trademarks or registered trademarks of International Business Machines Corporation in the United States, and/or other countries), among other catalogs.

A governance catalog (i.e., an information governance catalog) used by the data pipeline prioritization program 110, 110b may be a catalog of data which may assist in determining a priority of a data pipeline. A governance catalog may, for example, map and/or store business information to technical information. The business information and/or associated metadata may include users of a set of data, and time of use of a set of data, among many other points of business information which may be critical to the determination of priority of a job (i.e., a data pipeline).

An estimation of job start time module 306 may refer to a machine learning analysis of available bandwidth of an executing server (i.e., a server, a consumption resource) at a given time, and may take into consideration any service level agreements (SLAs). For example, if an agreed upon job (i.e., data pipeline) in a service level agreement (SLA) is to complete within twelve hours, based on a machine learning analysis of the job's start time and the usual load of servers at the job's start time, and if it was agreed upon that the job in the SLA would complete within eight hours, then the data pipeline prioritization program 110a, 110b may increase the priority of the job in order to reduce the job's completion time, based on the agreed upon SLA.

An estimation of job start time may include an analysis of the time required to finish a job in order to meet an SLA. This analysis may also include, but is not limited to including, information such as the availability of computational resources from the resource analysis consumption module 308, as described in more detail below.

A resource consumption analysis module 308 may refer to an analysis of the number of computational resources (i.e., executing servers) required to complete a job (i.e., a data pipeline). This analysis may include whether the job may require fewer or additional computational resources. If a job may be completed with fewer resources, then the data pipeline prioritization program 110a, 110b may reprioritize the job so that fewer resources may be utilized, as the job may not be competing with other jobs. The data pipeline prioritization program 110a, 110b may further determine that additional jobs may be scheduled (e.g., based on freeing up available resources).

Prior to scheduling a data pipeline (i.e., a job), the data pipeline prioritization program 110a, 110b may check whether any required computational resources are available. The data pipeline prioritization program 110a, 110b may determine a current priority based on an assigned historical priority. Historical usage data may be determined based on information stored within, or accessed by, the data pipeline prioritization program 110a, 110b.

For example, if a data pipeline (i.e., a job) follows the extract, load, and transform (ELT) data processing approach, this may mean that data is first extracted from the pipeline, loaded into a target database, and transformed and integrated into a desired format. The transformation processing in an ELT pipeline may take place within the target database, requiring little to no additional resources. In this case, the resource consumption analysis may reveal that since fewer resources are required for the handling of the ELT pipeline, more pipelines can be scheduled simultaneously with the ELT pipeline. That is to say that the ELT pipeline may be given a higher priority as it may not be competing for resources with other data pipelines.

A user consumption analysis module 310 may refer to an analysis of which users may be waiting for the results of the data pipeline (i.e., the job). A data pipeline may become more critical (i.e., may be given a higher priority) depending on the user or users waiting for the outcome. User consumption information may be gathered from IBM's InfoSphere® Information Governance Catalog (InfoSphere and all InfoSphere-based trademarks are trademarks or registered trademarks of International Business Machines Corporation in the United States, and/or other countries). For example, a paid user may be given a higher priority than a free user, and a corporation's data steward may be given a lower priority than the corporation's chief technology officer.

A historical priority module 312 may refer to an analysis of the priority given to a job (i.e., a data pipeline) or to a similar job, or to a job with similar characteristics. This analysis may take into consideration any user provided (i.e., manual) priority entries of a given job. An analysis of historical priority may be useful in assigning weights to a similar job.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

According to at least one alternate embodiment of the present invention, a manual input of priority by a user of the data pipeline prioritization program 110a, 110b may be used in the place of a machine learning algorithm to generate a prioritization scheme for a data pipeline.

Figure 4:
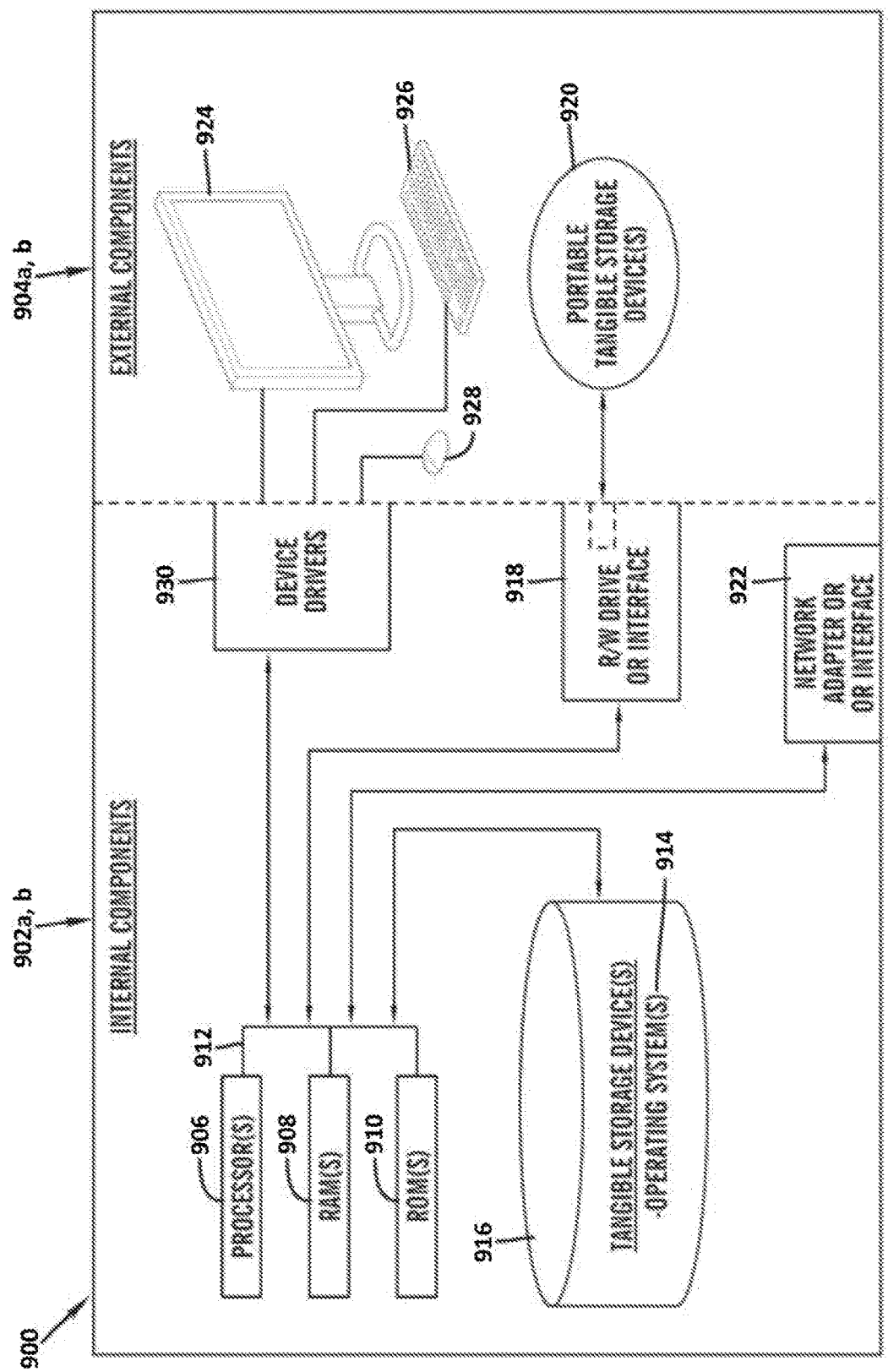
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 44 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data pipeline prioritization program 110a in client computer 102, and the data pipeline prioritization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data pipeline prioritization program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the data pipeline prioritization program 110a in client computer 102 and the data pipeline prioritization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data pipeline prioritization program 110a in client computer 102 and the data pipeline prioritization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
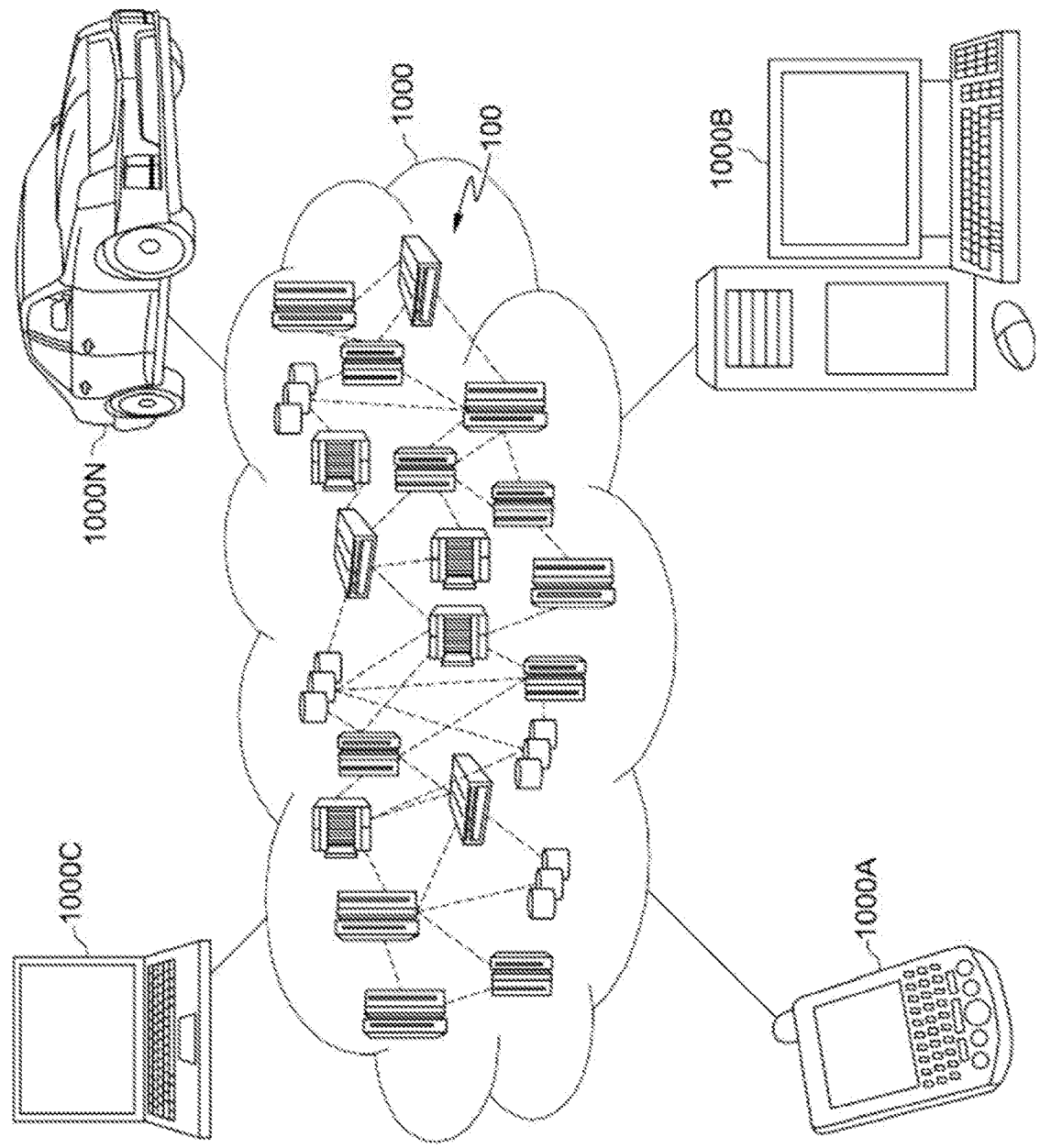
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
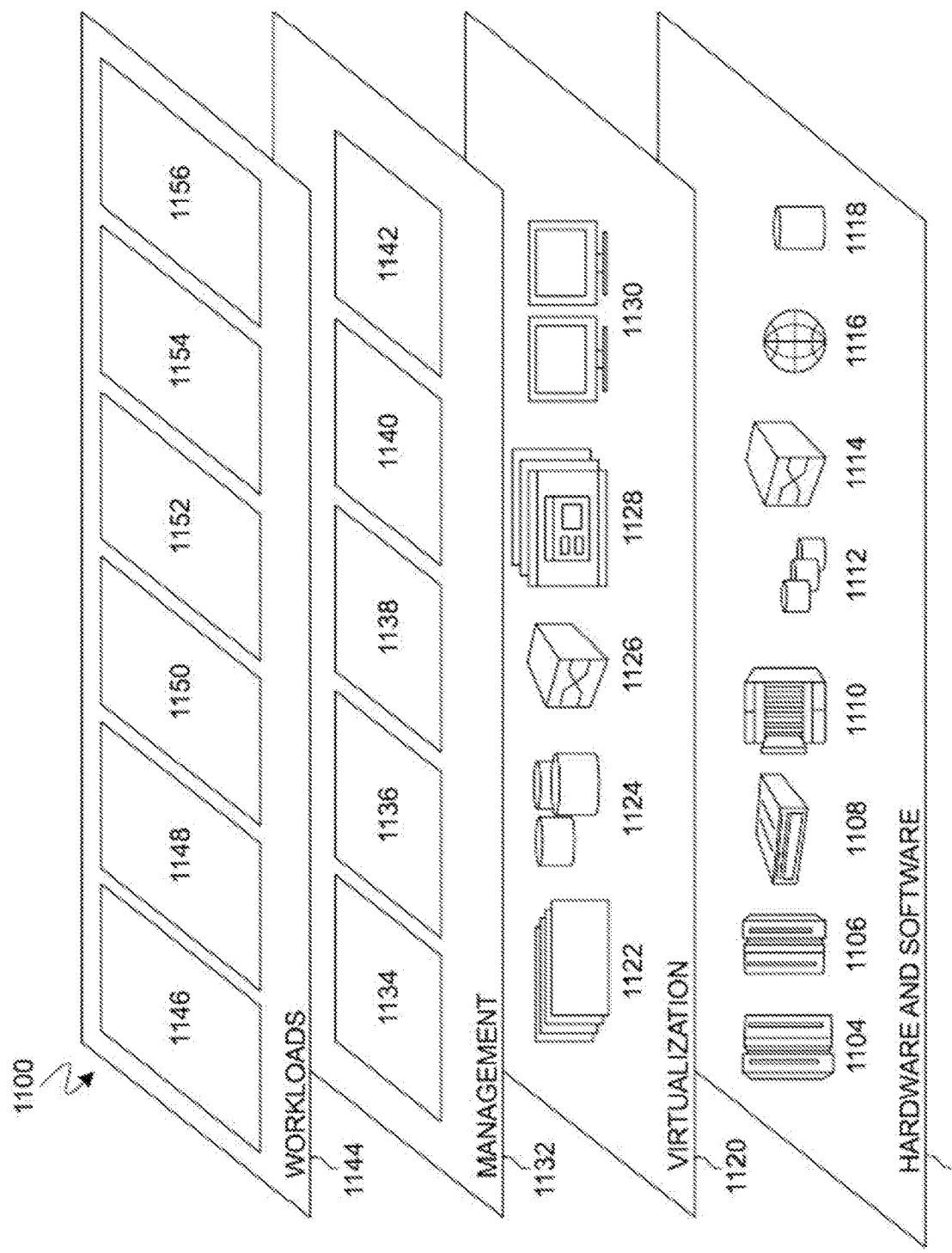
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data pipeline prioritization 1156. A data pipeline prioritization program 110a, 110b provides a way to utilize a machine learning algorithm to prioritize data pipelines being run on a data lake. The present embodiment may automatically assign priorities to incoming data pipelines based on who is expected to consume the results of the pipeline, the overall resources needed to run the job, and/or when the job needs to be triggered based on a service level agreement (SLA) for the job. The machine learning algorithm may be trained on previous job runs, an analysis of dependencies on other pipelines, resource consumption data, and historical priorities.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for job prioritization, the method comprising:
receiving, by a cognitive rules engine, one or more jobs;
analyzing, using a learned metric of the cognitive rules engine, the one or more jobs, wherein the learned metric is based on a user inputted priority of the one or more jobs, a number of consumers of a result of the one or more jobs, a dependency of the one or more jobs, a number of computational resources required to run the one or more jobs, wherein the learned metric of the cognitive rules engine comprises:
using a result consumption analysis module to predict the number of consumers of the result of the one or more jobs;
using a dependency analysis module to determine the dependency of the one or more jobs on each other;
using an estimation of job start time module to determine a time required to finish a jobs in order to meet a service level agreement (SLA);
using a resource consumption analysis module to determine the number of computational resources required to run the one or more jobs;
using a user consumption analysis module to determine a consumer of the result of the one or more jobs; and
using a historical priority module to determine a historical priority of the one or more jobs or of a job with same characteristics; and
prioritizing the one or more jobs based on a result of the learned metric of the cognitive rules engine.

2. The method of claim 1, wherein the one or more jobs feeds into a data repository.

3. The method of claim 1, wherein, based on the dependency analysis module, a priority of the one or more jobs increases when a result of the one or more jobs is used by another job with a higher priority.

4. The method of claim 1, wherein, based on the estimation of job start time module, a priority of the one or more jobs increases when triggering the one or more jobs will meet a service level agreement (SLA).

5. The method of claim 1, further comprising:
predicting an availability of an executing server, based on learned metrics which are results of the resource consumption analysis module and the estimation of job start time module.

6. The method of claim 5, further comprising:
generating a predictive model for job prioritization based on a modified value of the learned metric of the cognitive rules engine.

7. A computer system for job prioritization, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:
receiving, by a cognitive rules engine, one or more jobs;
analyzing, using a learned metric of the cognitive rules engine, the one or more jobs, wherein the learned metric is based on a user inputted priority of the one or more jobs, a number of consumers of a result of the one or more jobs, a dependency of the one or more jobs, a number of computational resources required to run the one or more jobs, wherein the learned metric of the cognitive rules engine comprises:
using a result consumption analysis module to predict the number of consumers of the result of the one or more jobs;
using a dependency analysis module to determine the dependency of the one or more jobs on each other;
using an estimation of job start time module to determine a time required to finish a jobs in order to meet a service level agreement (SLA);
using a resource consumption analysis module to determine the number of computational resources required to run the one or more jobs;
using a user consumption analysis module to determine a consumer of the result of the one or more jobs; and
using a historical priority module to determine a historical priority of the one or more jobs or of a job with same characteristics; and
prioritizing the one or more jobs based on a result of the learned metric of the cognitive rules engine.

8. The computer system of claim 7, wherein the one or more jobs feeds into a data repository.

9. The computer system of claim 7, wherein, based on the dependency analysis module, a priority of the one or more jobs increases when a result of the one or more jobs is used by another job with a higher priority.

10. The computer system of claim 7, wherein, based on the estimation of job start time module, a priority of the one or more jobs increases when triggering the one or more jobs will meet a service level agreement (SLA).

11. The computer system of claim 7, further comprising:
predicting an availability of an executing server, based on learned metrics which are results of the resource consumption analysis module and the estimation of job start time module.

12. The computer system of claim 11, further comprising:
generating a predictive model for job prioritization based on a modified value of the learned metric of the cognitive rules engine.

13. A computer program product for job prioritization, comprising:
one or more non-transitory computer-readable storage media and program instructions stored on at least one of the one or more tangible storage media, the program instructions executable by a processor to cause the processor to perform a method comprising:
receiving, by a cognitive rules engine, one or more jobs;
analyzing, using a learned metric of the cognitive rules engine, the one or more jobs, wherein the learned metric is based on a user inputted priority of the one or more jobs, a number of consumers of a result of the one or more jobs, a dependency of the one or more jobs, a number of computational resources required to run the one or more jobs, wherein the learned metric of the cognitive rules engine comprises:
using a result consumption analysis module to predict the number of consumers of the result of the one or more jobs;
using a dependency analysis module to determine the dependency of the one or more jobs on each other;
using an estimation of job start time module to determine a time required to finish a jobs in order to meet a service level agreement (SLA);
using a resource consumption analysis module to determine the number of computational resources required to run the one or more jobs;
using a user consumption analysis module to determine a consumer of the result of the one or more jobs; and
using a historical priority module to determine a historical priority of the one or more jobs or of a job with same characteristics; and
prioritizing the one or more jobs based on a result of the learned metric of the cognitive rules engine.

14. The computer program product of claim 13, wherein the one or more jobs feeds into a data repository.

15. The computer program product of claim 13, wherein, based on the dependency analysis module, a priority of the one or more jobs increases when a result of the one or more jobs is used by another job with a higher priority.

16. The computer program product of claim 13, further comprising:
predicting an availability of an executing server, based on learned metrics which are results of the resource consumption analysis module and the estimation of job start time module.

17. The computer program product of claim 16, further comprising:
generating a predictive model for job prioritization based on a modified value of the learned metric of the cognitive rules engine.

\* \* \* \* \*